United States Patent
Stein et al.

(10) Patent No.: US 9,757,995 B2
(45) Date of Patent: Sep. 12, 2017

(54) HUB CAP DATA REPEATER CIRCUIT

(71) Applicant: GOODRICH CORPORATION, Charlotte, NC (US)

(72) Inventors: Eric Stein, Troy, OH (US); Paul L. Summers, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 312 days.

(21) Appl. No.: 14/670,059

(22) Filed: Mar. 26, 2015

(65) Prior Publication Data
US 2016/0280017 A1 Sep. 29, 2016

(51) Int. Cl.
| | |
|---|---|
| B60C 23/02 | (2006.01) |
| B60C 23/04 | (2006.01) |
| B60C 23/06 | (2006.01) |
| B60B 7/00 | (2006.01) |
| B60B 7/04 | (2006.01) |
| B64C 25/36 | (2006.01) |
| B64C 25/44 | (2006.01) |

(52) U.S. Cl.
CPC ........ *B60C 23/0408* (2013.01); *B60B 7/0013* (2013.01); *B60B 7/04* (2013.01); *B60C 23/04* (2013.01); *B60C 23/06* (2013.01); *B64C 25/36* (2013.01); *B64C 25/44* (2013.01); *B60C 2200/02* (2013.01)

(58) Field of Classification Search
CPC .... B60C 23/04; B60C 23/0408; B60B 7/0013
USPC .... 73/146.4, 146.5; 340/442, 445, 447, 448, 340/453, 454
See application file for complete search history.

(56) References Cited

U.S. PATENT DOCUMENTS

| | | | | |
|---|---|---|---|---|
| 5,061,917 A * | 10/1991 | Higgs | ................ | B60C 23/0408 340/447 |
| 7,202,778 B2 * | 4/2007 | Buenz | ................ | B60C 23/0428 340/445 |
| 7,489,996 B2 * | 2/2009 | Gowan | ................ | B60T 8/1703 180/197 |
| 8,091,418 B2 * | 1/2012 | Acker | ................ | B60C 23/0413 73/146 |
| 2004/0075022 A1 * | 4/2004 | MacKness | .......... | B60C 23/0408 244/100 R |
| 2015/0008759 A1 * | 1/2015 | Lamping | ................ | G01L 17/00 307/104 |

OTHER PUBLICATIONS

Author: Alan S Morris, Title: Measurement and Instrumentation Principles, Date: 2001, Publisher: Butterworth-Heinemann, Edition: third, pp. cover page, i-iv and 73-78.*

* cited by examiner

*Primary Examiner* — Lisa Caputo
*Assistant Examiner* — Roger Hernandez-Prewitt

(57) ABSTRACT

A system includes a wheel, a hubcap coupled to the wheel and a tire pressure sensor coupled to the wheel. The system also includes a brake control unit (BCU) and an active hubcap circuit coupled to the hubcap. The active hubcap circuit is electrically coupled to the tire pressure sensor and the BCU and configured to receive an input signal from at least one of the tire pressure sensor or the BCU, generate an output signal by increasing a signal to noise ratio of the input signal and output the output signal to at least one of the BCU or the tire pressure sensor.

15 Claims, 5 Drawing Sheets

HUB CAP DATA REPEATER CIRCUIT

FIELD

The present disclosure relates to a tire pressure sensing system, and more particularly to a repeater circuit positioned on a hubcap and coupled to a tire pressure sensor.

BACKGROUND

Aircraft may include landing gear having wheels for supporting the weight of the aircraft while the aircraft is not flying. A tire may be coupled to each wheel of each landing gear defining a volume that may be pressurized. Thus, the tires provide a smoother ride and reduced risk of damage to the wheels and the aircraft. Tires may function optimally within a particular range of pressures.

SUMMARY

A system according to various embodiments is described herein. The system includes a wheel, a hubcap coupled to the wheel and a tire pressure sensor coupled to the wheel. The system also includes a brake control unit (BCU) and an active hubcap circuit coupled to the hubcap. The active hubcap circuit is electrically coupled to the tire pressure sensor and the BCU and configured to receive an input signal from at least one of the tire pressure sensor or the BCU, generate an output signal by increasing a signal to noise ratio of the input signal and output the output signal to at least one of the BCU or the tire pressure sensor.

A system according to various embodiments is described herein. The system includes a wheel, a hubcap coupled to the wheel and a tire pressure sensor coupled to the wheel, and a brake control unit (BCU). The system also includes an active hubcap circuit coupled to the hubcap, electrically coupled to the tire pressure sensor and the BCU and configured to receive an input signal from at least one of the tire pressure sensor or the BCU, generate an output signal by increasing the signal to noise ratio of the input signal and output the output signal to at least one of the BCU or the tire pressure sensor. The system also includes a cable having a cable first end electrically connected to the active hubcap circuit and a cable second end. The system also includes a connector having a first end electrically and mechanically connected to the cable second end and a second end mechanically connected to the tire pressure sensor and electrically coupled to the tire pressure sensor via a first transformer. The system also includes an axle transformer mount electrically connected to the BCU and electrically coupled to the active hubcap circuit via a second transformer and configured to detect a wheel speed of the wheel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

In various embodiments, systems with distributing sensing capabilities may employ a signal monitoring system that allows for power and data to be communicated over the same power distribution channels (e.g., power supply and/or wires). By employing this type of system, the complexity and amount of wires in a system may be reduced, reducing the overall weight of the aircraft. For example, a traditional system may use separate power distribution lines and data communication lines for each sensor in a distributed sensing system. However, by using the power distribution lines to communicate data, the complexity of the wiring and overall number of lines may be reduced.

In various embodiments, the systems described herein may be used in various systems and applications including, for example, down-hole drilling, military applications, construction applications, transportation applications and/or the like. While described in the context of aircraft applications, and more specifically, in the context of tire pressure monitoring, the various embodiments of the present disclosure may be applied to any suitable application.

Figure 1:
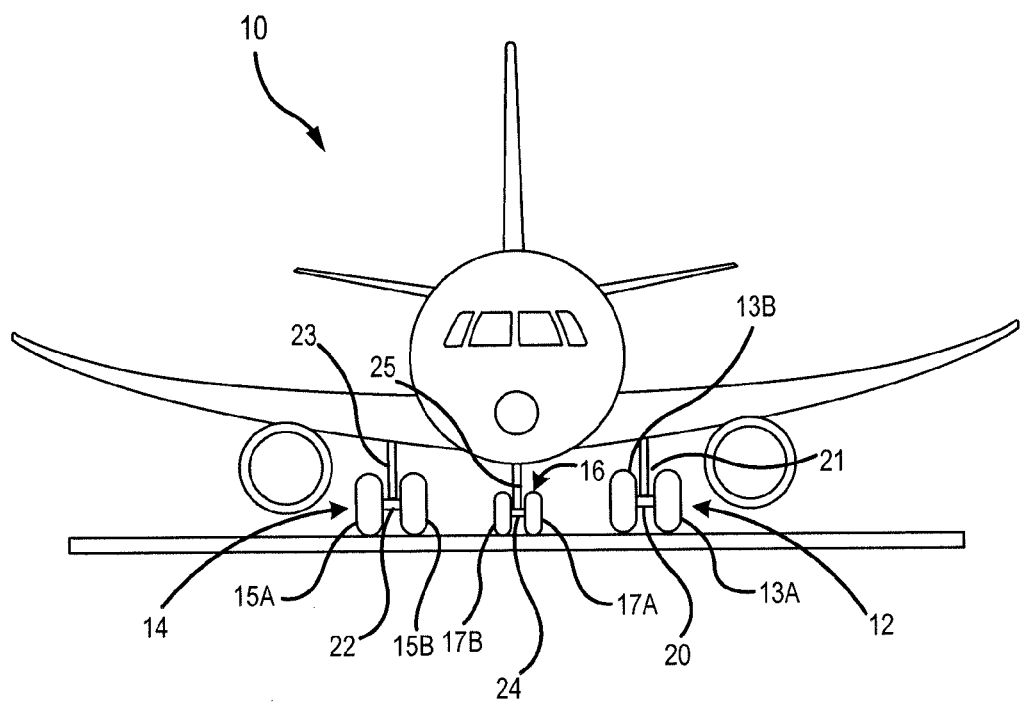
FIG. 1 illustrates an aircraft having landing gear, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20 and coupled to aircraft 10 via a strut 21; landing gear 14 may include wheel 15A and wheel 15B coupled by an axle 22 and coupled to aircraft 10 via a strut 23; and landing gear 16 may include nose wheel 17A and nose wheel 17B coupled by an axle 24 and coupled to aircraft 10 via a strut 25. The nose wheels differ from the main wheels in that the nose wheels may not include a brake and/or a wheel speed transducer.

Figure 2:
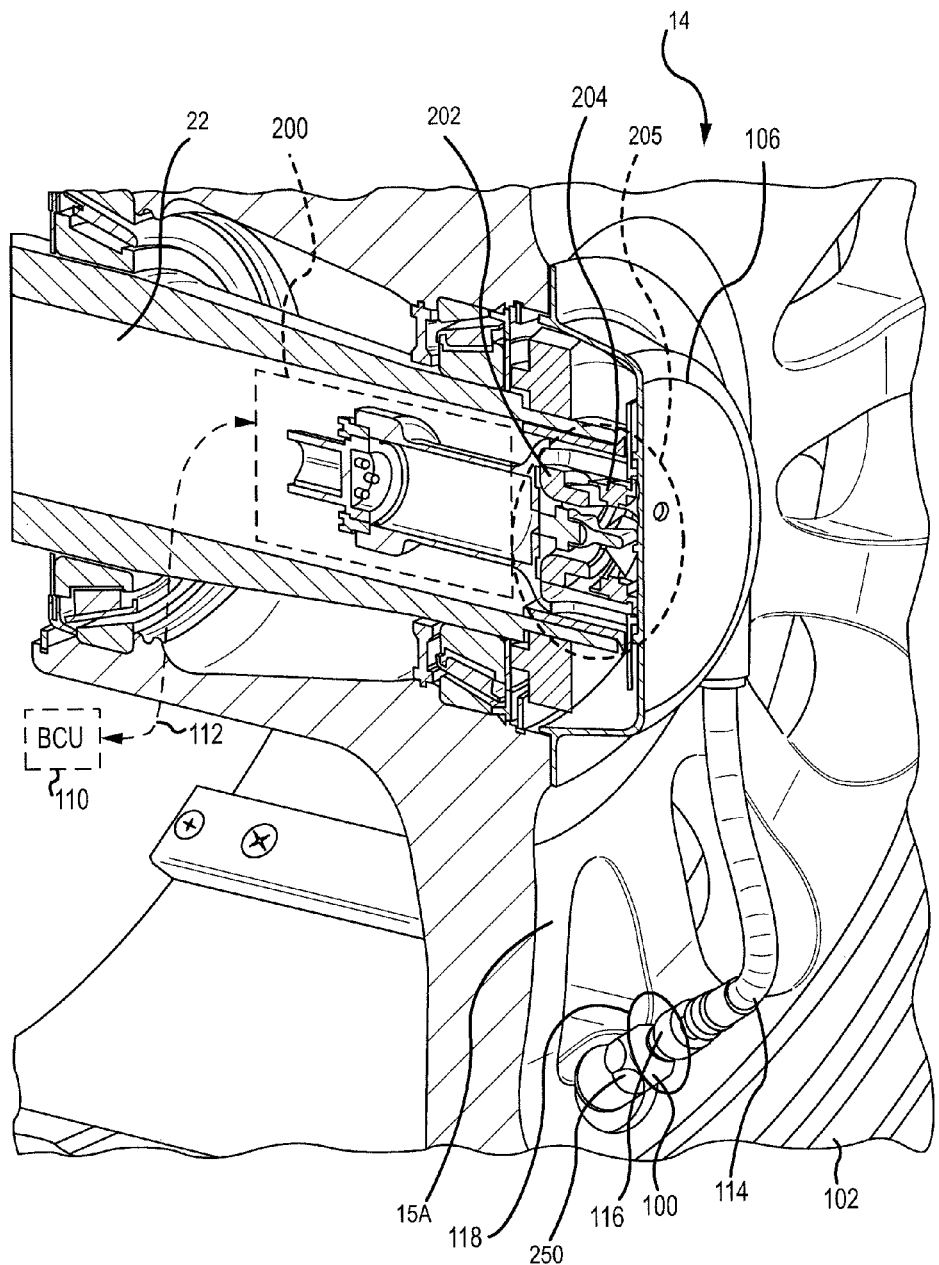
FIG. 2 illustrates a wheel of an aircraft landing gear including a hubcap, a tire pressure sensor, an axle transformer mount and a brake control unit, in accordance with various embodiments.

With reference now to FIG. 2, wheel 15A, in accordance with various embodiments, may be operatively coupled to a tire 102. In this regard, tire 102 may be mounted on wheel 15A. Tire 102 may define a volume between tire 102 and wheel 15A capable of being pressurized. It may be desirable for an operator or maintenance worker to monitor tire pressure of tire 102. In this regard, a tire pressure sensor 100 is coupled to wheel 15A and capable of sensing a pressure within the volume defined by tire 102. In that regard, tire pressure sensor 100 may include at least a portion that is exposed to the pressure within tire 102 for sensing the pressure.

Tire pressure sensor 100 may be coupled to a first end of a connector 116 mechanically and electrically. In various embodiments, tire pressure sensor 100 may be electrically coupled to connector 116 via a transformer 118. In this regard, tire pressure sensor 100 may be electrically coupled to connector 116 without direct contact of conducting materials. Thus, tire pressure sensor 100 may be sealed from the environment, preventing exposure of components within tire pressure sensor 100. A second end of connector 116 is coupled to a first end of a cable 114 such that it is also coupled to components internal to a hubcap 106 via cable 114.

Figure 3:
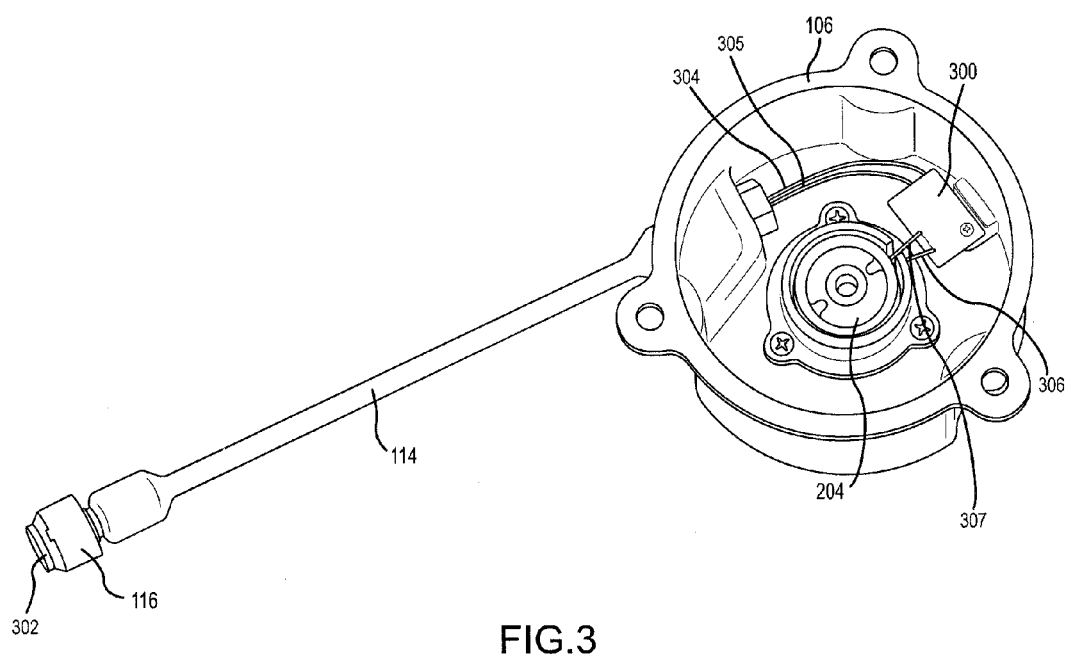
FIG. 3 illustrates another view of the hubcap of FIG. 2 including an active hubcap circuit, in accordance with various embodiments.

With reference now to FIGS. 2 and 3 and in accordance with various embodiments, hubcap 106, cable 114 and connector 116 are illustrated with an interior of hubcap 106 being shown (i.e., the portion of hubcap 106 proximal to axle 22 is shown). With brief reference now to FIGS. 2, 3 and 4, connector 116 may include a coil 302 capable of interfacing with a coil 402 of tire pressure sensor 100 in order to form a wireless connection in the form of a transformer. When coil 302 is positioned adjacent coil 402, power and/or data signals may transfer wirelessly between coil 302 and coil 402. In that regard, herein if two coils are described as "adjacent" in the context of forming a transformer, "adjacent" refers to any positioning of the coils in which a signal may propagate therebetween. Additionally, materials may be present between "adjacent" coils that form a transformer so long as a signal may still propagate between the coils.

With renewed reference to FIGS. 2 and 3, a second end of cable 114 is electrically coupled to an active hubcap circuit 300 via wires 304 and 305. In various embodiments, wires 304 and 305 may continue through cable 114 such that cable 114 includes a protective outer cover and wires 304 and 305. Active hubcap circuit 300 is mechanically coupled to hubcap 106 and electrically coupled to another coil 204 via wires 306 and 307. Active hubcap circuit 300 may be capable of receiving a signal, such as a power signal or a data signal, from tire pressure sensor 100 via connector 116, cable 114 and wires 304 and 305. Active hubcap circuit 300 may repeat the signal from tire pressure sensor 100 and transmit the repeated signal to a braking control unit (BCU) 110 via wires 306 and 307 and other components. In some embodiments, active hubcap circuit 300 may transmit the repeated signal to any other type of tire pressure monitoring unit instead of BCU 110. Active hubcap circuit 300 is also capable of receiving a signal, such as a power signal or data signal, from BCU 110 via wires 306, repeating the signal and transmitting the signal to tire pressure sensor 100. Where used herein, repeating a signal may include one or more of the following: filter a signal, amplify a signal, detect peaks and valleys of a signal and generate a new signal based on the peaks and valleys, allow the signal to pass unchanged, convert a signal from analog to digital and/or digital to analog or otherwise improve a signal to noise ratio of a signal as it is repeated through active hubcap circuit 300.

With continued reference to FIGS. 2 and 3 and in accordance with various embodiments, a coil 202 is positioned at an end of strut 23 proximal to hubcap 106. Coil 202 is positioned adjacent coil 204 forming another transformer 205.

Coil 202 is electrically coupled to an axle transformer mount 200. Axle transformer mount 200 may be coupled to axle 22 and include circuitry capable of determining and/or detecting a rotational speed of wheel 15A and may be, for example, a wheel speed transducer or an axle telemetry unit (ATU). Axle transformer mount 200 is electrically coupled to BCU 110 via a connection 112.

Tire pressure sensor 100 may not include a battery or other power storage or generation device for powering tire pressure sensor 100 (not including capacitors for signal phase change or delay). BCU 110 may be coupled to a power source and may operate based on pressure data detected by tire pressure sensor 100. BCU 110 and tire pressure sensor 100 may be electrically coupled via axle transformer mount, transformer 205 (including coil 202 and coil 204), wires 306 and 307, active hubcap circuit 300, wires 304 and 305, cable 114, connector 116 and transformer 118 (including coil 302 and coil 402). In this regard, BCU 110 may thus transmit power to tire pressure sensor 100 and tire pressure sensor 100 may transmit a signal corresponding to a pressure measurement of tire 102 to BCU 110.

Signal to noise ratio may decrease over a transformer. Accordingly, because of the wireless signal jumps within transformer 205 and transformer 118, signal to noise ratio of signals passing through these transformers may decrease. In that regard, active hubcap circuit 300 improves the signal to noise ratio of signals propagating through active hubcap circuit 300. In various embodiments, active hubcap circuit 300 may improve the signal to noise ratio of signals propagating from BCU 110 to tire pressure sensor 100, signals propagating from tire pressure sensor 100 to BCU 110, data signals, power signals or any combination of the above.

Figure 4:
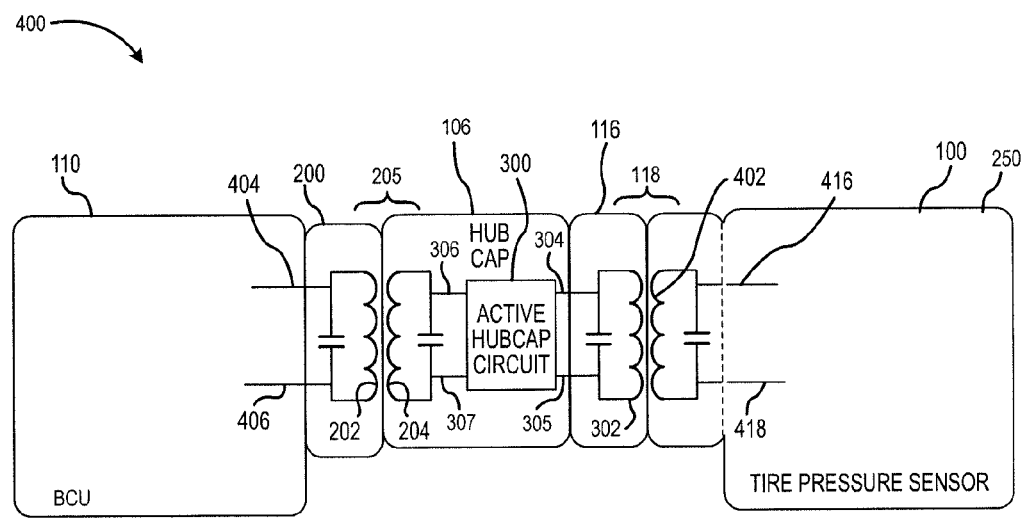
FIG. 4 illustrates a block diagram of tire pressure monitoring system including the tire pressure sensor of FIG. 2, the active hubcap circuit of FIG. 3 and a brake control unit, in accordance with various embodiments.

With reference now to FIG. 4 and in accordance with various embodiments, components discussed with reference to FIGS. 2 and 3 may be considered part of a pressure sensing system 400. Pressure sensing system 400 may include BCU 110, axle transformer mount 200, hubcap 106, connector 116 and tire pressure sensor 100.

As illustrated, BCU 110 may be electrically coupled to axle transformer mount 200 via wires 404 and 406. Axle transformer mount 200 may include coil 202 and hubcap 106 may include coil 204. Coil 202 and coil 204 may be positioned adjacent each other forming transformer 205. In that regard, a signal may be transmitted between axle transformer mount 200 and hubcap 106 that may rotate relative to axle transformer mount 200 via a wireless connection over transformer 118.

Coil 204 may be electrically coupled to active hubcap circuit 300. Active hubcap circuit 300 may be mechanically coupled to hubcap 106. As mentioned above, active hubcap circuit 300 may increase a signal to noise ratio of a received signal.

Active hubcap circuit 300 may be electrically coupled to connector 116 via wires 304 and 305, which may be contained within cable 114 or coupled to other wires within cable 114. In various embodiments, active hubcap circuit 300 may be electrically connected to connector 116 in another fashion.

Connector 116 may include coil 302. Tire pressure sensor 100 may include a coil 402. Connector 116 may include a mechanical connector such that it can be removably or permanently coupled to tire pressure sensor 100. When connector 116 is coupled to tire pressure sensor 100, coil 302 may be positioned adjacent coil 402 such that coil 302 and coil 402 form transformer 118. Accordingly, coil 302 and coil 402 are not required to be in contact for the connection to operate properly. In that regard and with reference to FIGS. 2 and 4, tire pressure sensor 100 may include a body 250 defining a cavity in which components, including or excluding coil 402, may be hermetically sealed. By sealing components within body 250, the components will not be exposed to the environment and may have a longer duration of proper operation. Because coil 302 and coil 402 should be adjacent, signals may still propagate between coil 402 sealed within body 250 and coil 302 outside of body 250. In various embodiments, coil 402 may be positioned external to body 250 such that coil 402 may be connected to components of tire pressure sensor 100 via wires 416 and 418.

Figure 5:
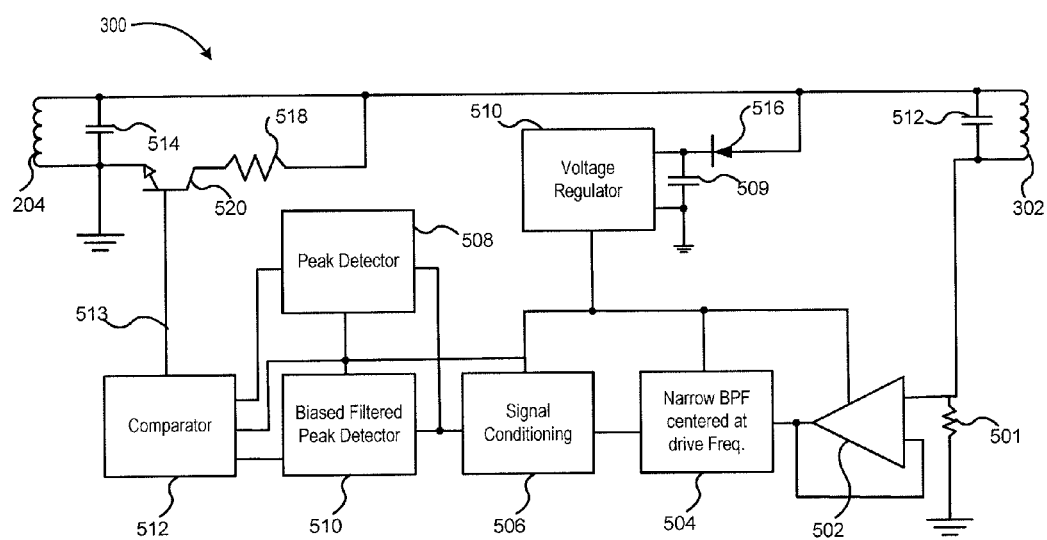
FIG. 5 illustrates a circuit that may be used as an active hubcap circuit, in accordance with various embodiments.

With reference to FIG. 5, a circuit 500 in accordance with various embodiments may be used as an active hubcap circuit such as active hubcap circuit 300 of FIGS. 3 and 4. Circuit 500 includes an amplifier 502, a filter 504, a signal conditioning module 506, a peak detector 508, a biased filtered peak detector 510, a comparator 512, a voltage regulator 510, a rectifier 516, a capacitor 512, a resistor 501, a resistor 518, a transistor 520 and a capacitor 514.

Amplifier 502 may receive a signal received from coil 302 (i.e., from tire pressure sensor 100) via capacitor 512. In various embodiments, the location of coil 302 and coil 204 may be changed such that amplifier 502 receives input from coil 204 (i.e., from BCU 110). Amplifier 502 may sense the voltage drop across a current sense resistor 501. Amplifier 502 may function as a buffer amplifier and may have a unity gain or may have a gain larger than 1.

The signal may also be provided to voltage regulator 510 via rectifier 516. Rectifier 516, capacitor 509 and voltage regulator 510 may convert a voltage signal received from either coil 204 or coil 302 into a DC voltage for use by the components of active hubcap circuit 500.

The output of amplifier 502 may be received by filter 504. In various embodiments, filter 504 may be a band pass filter (BPF) centered at or near a frequency of modulation of the input signal. The filtering may eliminate and/or isolate portions of the received signal including, for example, a carrier signal, noise and/or the like.

The output of filter 504 may be received by signal conditioning module 506. Signal conditioning module 506 may extract a particular desired portion of the input signal. For example, the input signal may include a power component and a data component. Signal conditioning module 506 may separate the data component or the power component from the input signal. Signal conditioning module 506 may also digitize the desired portion of the input signal. This may include conditioning the signal to make it suitable for further processing by microelectronics.

The output of signal conditioning module 506 may be received by peak detector 508 and biased filtered peak detector 510 in parallel. The output of peak detector 508 and biased filtered peak detector 510 may be received by comparator 512 which then outputs a digitized signal 513 representative of the output of tire pressure sensor 250. In that regard, peak detector 508, biased filtered peak detector 510 and comparator 512 may operate in tandem to determine values of each of the peaks and/or valleys of the signal such that binary values of the signal may be determined.

Digitized signal 513 of comparator 512 may be coupled to resistor 518 and capacitor 514 via transistor 520. The output of transistor 520, resistor 518 and capacitor 514 may be received by coil 204 such that the output can be received by BCU 110. In various embodiments, the output may be received by tire pressure sensor 100 instead of BCU 110. In various embodiments, two active hubcap circuits may be present such that data signals can be propagated between tire pressure sensor 100 and BCU 110 in both directions.

In various embodiments, circuit 500 may include greater or fewer components than illustrated in FIG. 5. For example, circuit 500 may only include amplifier 502 for amplifying input signal 501. As another example, a modulation module may be coupled to output 513 such that circuit 500 outputs a modulated output of comparator 512.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
   a wheel;
   a hubcap coupled to the wheel;
   a tire pressure sensor coupled to the wheel;
   a brake control unit (BCU); and
   an active hubcap circuit coupled to the hubcap, electrically coupled to the tire pressure sensor and the BCU and configured to receive an input signal from at least one of the tire pressure sensor or the BCU, generate an output signal by increasing a signal to noise ratio of the input signal by passing the input signal through a peak detector and a biased, filtered peak detector that is in parallel with the peak detector and output the output signal to at least one of the BCU or the tire pressure sensor.

2. The system of claim 1, further comprising a cable electrically coupled to the tire pressure sensor and the active hubcap circuit.

3. The system of claim 2, further comprising a connector having a first end electrically and mechanically connected to the cable and a second end mechanically connected to the tire pressure sensor and having a first coil, wherein the tire pressure sensor has a second coil positioned adjacent the first coil such that the first coil and the second coil operate as a transformer.

4. The system of claim 1, further comprising an axle transformer mount electrically positioned between the BCU and the active hubcap circuit and having a first end electrically connected to the BCU and a second end having a first coil, wherein the active hubcap circuit is electrically connected to a second coil such that the first coil and the second coil operate as a transformer.

5. The system of claim 4, wherein the second coil is configured to rotate relative to the first coil.

6. The system of claim 1, wherein the active hubcap circuit includes an amplifier configured to buffer the input signal.

7. The system of claim 1, wherein the active hubcap circuit includes a band pass filter configured to isolate portions of the input signal.

8. The system of claim 1, wherein the active hubcap circuit includes a signal conditioning module configured to extract a desired portion of the input signal.

9. The system of claim 1, wherein the active hubcap circuit is configured to increase the signal to noise ratio by detecting peaks of the input signal.

10. A system comprising:
    a wheel;
    a hubcap coupled to the wheel;
    a tire pressure sensor coupled to the wheel;
    a brake control unit (BCU);
    an active hubcap circuit coupled to the hubcap, electrically coupled to the tire pressure sensor and the BCU and configured to receive an input signal from at least one of the tire pressure sensor or the BCU, generate an output signal by increasing a signal to noise ratio of the input signal by passing the input signal through a peak detector and a biased, filtered peak detector that is in parallel with the peak detector and output the output signal to at least one of the BCU or the tire pressure sensor;
    a cable having a cable first end electrically connected to the active hubcap circuit and a cable second end;
    a connector having a first end electrically and mechanically connected to the cable second end and a second end mechanically connected to the tire pressure sensor and electrically coupled to the tire pressure sensor via a first transformer; and
    an axle transformer mount electrically connected to the BCU and electrically coupled to the active hubcap circuit via a second transformer and configured to detect a wheel speed of the wheel.

11. The system of claim 10, wherein the first transformer includes a first coil positioned on the tire pressure sensor and a second coil positioned on the second end of the connector.

12. The system of claim 10, wherein the second transformer includes a first coil positioned on the hubcap and a second coil positioned on the axle transformer mount.

13. The system of claim 10, wherein the active hubcap circuit includes an operational amplifier configured to buffer the input signal.

14. The system of claim 10, wherein the active hubcap circuit includes a band pass filter configured to isolate portions of the input signal.

15. The system of claim 10, wherein the active hubcap circuit includes a signal conditioning module configured to extract a desired portion of the input signal.

* * * * *